United States Patent
Chen

(10) Patent No.: US 11,240,871 B2
(45) Date of Patent: Feb. 1, 2022

(54) RELEASING INFORMATION TO IMPROVE CELL SELECTION IN DIFFERENT RESOURCE CONTROL STATES

(71) Applicant: Google LLC, Mountain View, CA (US)

(72) Inventor: Teming Chen, Taipei (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/761,221

(22) PCT Filed: Jun. 18, 2019

(86) PCT No.: PCT/US2019/037797
§ 371 (c)(1),
(2) Date: May 1, 2020

(87) PCT Pub. No.: WO2019/246147
PCT Pub. Date: Dec. 26, 2019

(65) Prior Publication Data
US 2020/0260522 A1 Aug. 13, 2020

Related U.S. Application Data

(60) Provisional application No. 62/687,679, filed on Jun. 20, 2018.

(51) Int. Cl.
*H04W 76/32* (2018.01)
*H04W 76/27* (2018.01)
(Continued)

(52) U.S. Cl.
CPC .......... *H04W 76/32* (2018.02); *H04B 7/0617* (2013.01); *H04B 7/0632* (2013.01);
(Continued)

(58) Field of Classification Search
CPC ..... H04W 76/32; H04W 76/10; H04W 72/04; H04W 72/046; H04W 72/085;
(Continued)

(56) References Cited

U.S. PATENT DOCUMENTS

| 9,439,143 | B2 | 9/2016 | Kim et al. | |
| 2013/0303165 | A1* | 11/2013 | Hole | H04W 36/0055 455/435.2 |

(Continued)

FOREIGN PATENT DOCUMENTS

| EP | 2663124 | 11/2013 |
| WO | 2019246147 | 12/2019 |

OTHER PUBLICATIONS

"3GPP TS 38.304 V1.2.0 (Jun. 2018)", 3GPP TS 38.304 V1.2.0 (Jun. 2018), Jun. 2018, 26 pages.
(Continued)

*Primary Examiner* — Michael Y Mapa
(74) *Attorney, Agent, or Firm* — Colby Nipper PLLC

(57) ABSTRACT

This document describes techniques and apparatuses for releasing information to improve cell selection in different resource control states. To improve communication performance, a user equipment (UE) 110 releases dedicated cell-selection information 306, which may not be appropriate as the UE 110 moves to different geographical locations and transitions to different resource control states 218. Different situations cause the UE 110 to release the dedicated cell-selection information 306, including performing a cell-selection procedure in an inactive state that selects another cell that does not support the inactive state, processing a paging message 308, or transitioning from the inactive state to an idle state. By releasing the dedicated cell-selection information 306, the UE 110 performs a future cell-selection procedure without relying on the dedicated cell-selection information. As a result, the UE 110 can select an optimal cell for achieving a target communication performance in different resource control states 218.

20 Claims, 7 Drawing Sheets

(51) Int. Cl.
  *H04W 8/08*    (2009.01)
  *H04W 36/08*   (2009.01)
  *H04W 48/20*   (2009.01)
  *H04W 68/00*   (2009.01)
  *H04B 7/06*    (2006.01)
  *H04L 5/00*    (2006.01)
  *H04W 72/04*   (2009.01)
  *H04W 72/08*   (2009.01)
  *H04W 74/08*   (2009.01)
  *H04W 76/10*   (2018.01)

(52) U.S. Cl.
  CPC ............. *H04L 5/0048* (2013.01); *H04W 8/08* (2013.01); *H04W 36/08* (2013.01); *H04W 48/20* (2013.01); *H04W 68/005* (2013.01); *H04W 72/04* (2013.01); *H04W 72/046* (2013.01); *H04W 72/085* (2013.01); *H04W 74/0833* (2013.01); *H04W 76/10* (2018.02); *H04W 76/27* (2018.02)

(58) Field of Classification Search
  CPC ... H04W 74/0833; H04W 76/27; H04W 8/08; H04W 36/08; H04W 48/20; H04W 68/005; H04B 7/0617; H04B 7/0632; H04L 5/0048
  USPC .... 370/329, 331; 455/435.1–445, 450–452.2
  See application file for complete search history.

(56) References Cited

U.S. PATENT DOCUMENTS

| | | | |
|---|---|---|---|
| 2018/0007577 A1 | 1/2018 | Guo et al. | |
| 2018/0176834 A1* | 6/2018 | Wei | H04W 36/0016 |
| 2018/0213452 A1 | 7/2018 | Kim et al. | |
| 2019/0306910 A1* | 10/2019 | Da Silva | H04W 36/30 |
| 2019/0349825 A1* | 11/2019 | Tseng | H04W 48/20 |
| 2019/0387570 A1* | 12/2019 | Byun | H04W 76/27 |

OTHER PUBLICATIONS

"Cell Selection and Reselection States", #GPP TSG-RAN WG2 #102, Busan, South Korea, May 21-25, 2018, May 2018, 6 pages.

"Email discussion report on [98#30][NR] RRC Connection Conlrol", 3GPP TSG RAN WG2 Meeting Ad-hoc R2-17; Jun. 2017, Jun. 2017, 55 pages.

"International Search Report and Written Opinion", PCT Application No. PCT/US2019/037797, dated Sep. 26, 2019, 13 pages.

"Running 36.331 CR for E-UTRA Connected to 5GC", 3GPP TSG-RAN2 Meeting #100 R2-17xxxx Reno, USA, Nov. 27-Dec. 1, 2017, Nov. 27, 2017-Dec. 1, 2017, 23 pages.

"International Preliminary Report on Patentability", Application No. PCT/US2019/037797, dated Dec. 22, 2020, 7 pages.

"Foreign Office Action", EP Application No. 19735119.0, dated Nov. 23, 2021, 6 pages.

\* cited by examiner

RELEASING INFORMATION TO IMPROVE CELL SELECTION IN DIFFERENT RESOURCE CONTROL STATES

BACKGROUND

The evolution of wireless communication to Fifth-Generation (5G) standards and technologies provide higher data rates and greater capacity, with improved reliability and lower latency, which enhances mobile broadband services. 5G technologies also provide new classes of services for vehicular, fixed wireless broadband, and the Internet of Things (IoT). The specification of the features in the 5G air interface for user equipment (UE) is defined as 5G New Radio (5G NR).

As a UE moves to different geographical locations, it is important to select a given cell to achieve a target communication performance. Some cell-selection procedures consider radio-frequency (RF) carrier priorities, cell cite priorities, quality of a radio link, signal strength, and so forth. Sometimes a network provides cell-selection information to the UE to bias or increase a likelihood of a given cell or type of cell being selected by the user equipment. In some situations, however, this information may cause the UE to select a sub-optimal cell.

SUMMARY

Techniques and apparatuses are described that enable releasing information to improve cell selection in different resource control states. The techniques and devices described are designed to improve communication performance by triggering the release of dedicated cell-selection information, which may not be appropriate as a user equipment (UE) moves to different geographical locations and transitions to different resource control states. By releasing the dedicated cell-selection information, the UE may be able to select an optimal cell for achieving a target communication performance in different resource control states.

Aspects described below include a method performed by a UE for releasing information to improve cell selection in different resource control states. The method includes storing dedicated cell-selection information and operating in an inactive state to suspend a connection to a current cell. The method also includes performing at least one action of a set of actions. The set of actions may include: performing a cell-selection procedure in the inactive state that selects another cell associated with a core network that does not support the inactive state (the triggering of selection of another cell may be based on detecting movement of a geographical location of the UE), processing a paging message, or transitioning from the inactive state to an idle state to release the connection to the current cell. The method further includes releasing the dedicated cell-selection information based on the at least one action of the set of actions to enable a subsequent cell-selection procedure to select an alternative cell independent of the dedicated cell-selection information. The method may further include receiving a request message that includes the dedicated cell-selection information and transitioning to the inactive state based on the request message.

Aspects described below include a UE with a radio-frequency transceiver. The UE also includes a processor and memory system configured to perform any of the methods described.

Aspects described below also include a system with means for releasing information to improve cell selection in different resource control states.

BRIEF DESCRIPTION OF THE DRAWINGS

Apparatuses of and techniques for releasing information to improve cell selection in different resource control states are described with reference to the following drawings. The same numbers are used throughout the drawings to reference like features and components.

DETAILED DESCRIPTION

Overview

This document describes techniques and devices enabling the release of information to improve cell selection in different resource control states. In some situations, a user equipment (UE) may be provided dedicated cell-selection information, which biases or increases a likelihood of a given cell or type of cell being selected by the UE. As the UE moves to different geographical locations, the dedicated cell-selection information may cause the UE to select a sub-optimal cell that does not achieve a target performance. The sub-optimal cell, for example, may lack signal strength, may not utilize a desired radio frequency, and so forth. This dedicated cell-selection information may also be retained as the UE transitions to different resource control states, such as from an inactive state to an idle state. Accordingly, the dedicated cell-selection information may not be appropriately configured for the current state.

The techniques and devices described are designed to improve communication performance by triggering the UE to release the dedicated cell-selection information. The release of the dedicated cell-selection information can occur while the UE is in an inactive state or an idle state. By releasing the dedicated cell-selection information, the UE may be able to select an optimal cell for achieving a target communication performance in different resource control states.

Example Environment

Figure 1:
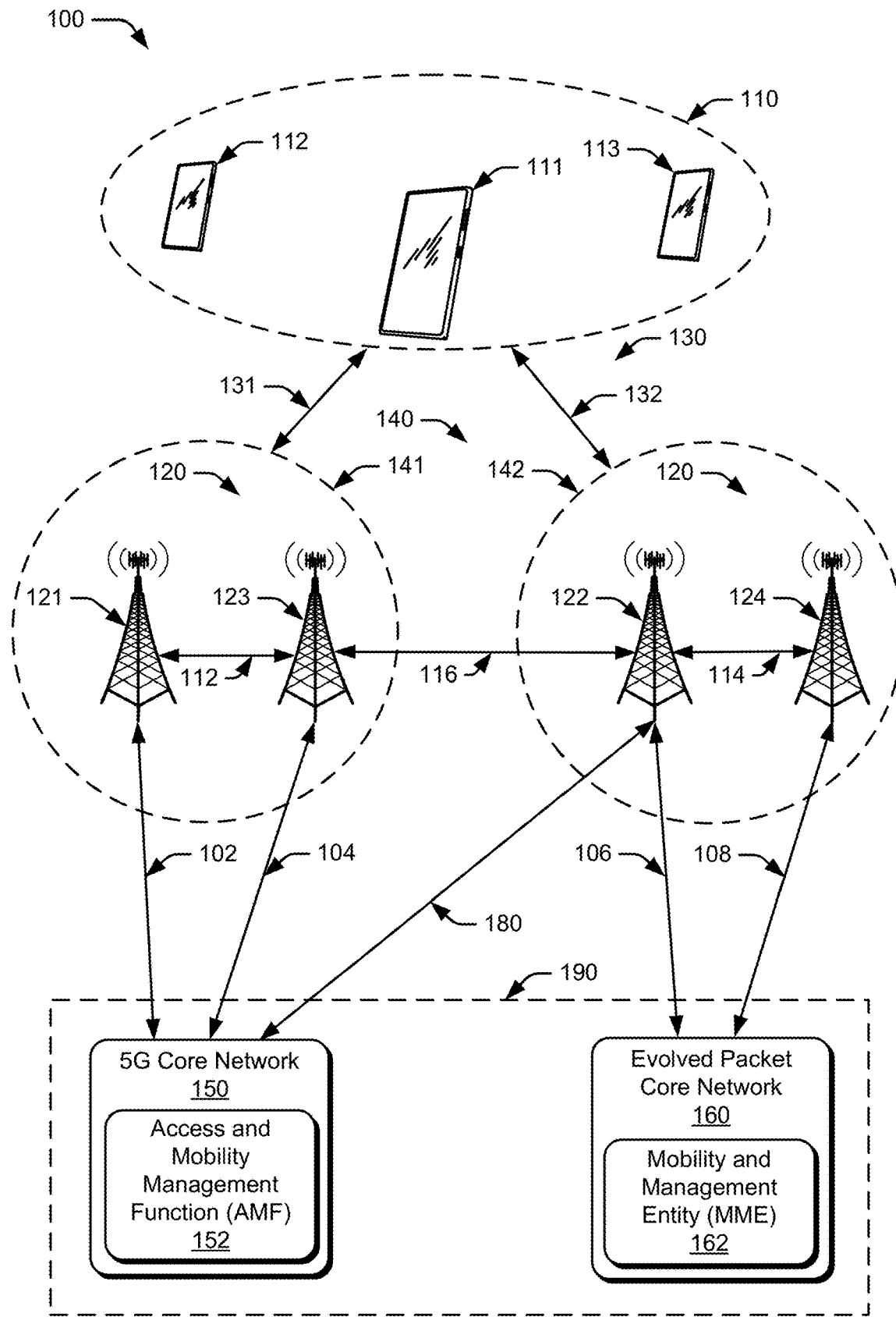
FIG. 1 illustrates an example wireless network environment in which releasing information to improve cell selection in different resource control states can be implemented.

FIG. 1 illustrates an example environment 100 in which parallel beamforming training with coordinated base stations can be implemented. The environment 100 includes multiple UEs 110, illustrated as UE 111, UE 112, and UE 113. Each UE 110 communicates with one or more base stations 120 (illustrated as base stations 121, 122, 123, and 124) through one or more wireless communication links 130 (wireless link 130), illustrated as wireless links 131 and 132. Although illustrated as a smartphone, the UE 110 can be implemented as any suitable computing or electronic device, such as a mobile communication device, a modem, a cellular phone, a gaming device, a navigation device, a media device, a laptop computer, a desktop computer, a tablet computer, a smart appliance, a vehicle-based communication system, and the like. The base station 120 (e.g., an Evolved Universal Terrestrial Radio Access Network Node B, E-UTRAN Node B, evolved Node B, eNodeB, eNB, Next Generation Evolved Node B, ng-eNB, Next Generation Node B, gNode B, gNB, or the like) can be implemented in a macrocell, microcell, small cell, picocell, or the like, or any combination thereof.

The base stations 120 communicate with the UE 110 using the wireless links 131 and 132, which may be implemented as any suitable type of wireless link. The wireless link 131 and 132 can include a downlink of data and control information communicated from the base stations 120 to the UE 110, an uplink of other data and control information communicated from the UE 110 to the base stations 120, or both. The wireless links 130 include one or more wireless links or bearers implemented using any suitable communication protocol or standard, or combination of communication protocols or standards such as 3rd Generation Partnership Project Long-Term Evolution (3GPP LTE), Enhanced Long-Term Evolution (eLTE), Fifth-Generation New Radio (5G NR), Fourth-Generation (4G) standard, and so forth. Multiple wireless links 130 can be aggregated using carrier aggregation to provide a higher data rate for the UE 110. Multiple wireless links 130 from multiple base stations 120 can be configured for Coordinated Multipoint (CoMP) communication with the UE 110.

The base stations 120 are collectively a Radio Access Network 140 (RAN, Evolved Universal Terrestrial Radio Access Network, E-UTRAN, 5G NR RAN or NR RAN) that each use a Radio Access Technology (RAT). The RANs 140 include a NR RAN 141 and an E-UTRAN 142. In FIG. 1, core networks 190 include a Fifth-Generation Core (5GC) network 150 (5GC 150) and an Evolved Packet Core (EPC) network 160 (EPC 160), which are different types of core networks. The base stations 121 and 123 in the NR RAN 141 connect to the 5GC 150. The base stations 122 and 124 in the E-UTRAN 142 connect to the EPC 160. Optionally or additionally, the base station 122 connects to both the 5GC 150 and EPC 160 networks.

The base stations 121 and 123 connect, at 102 and 104 respectively, to the 5GC 150 using an NG2 interface for control-plane signaling and using an NG3 interface for user-plane data communications. The base stations 122 and 124 connect, at 106 and 108 respectively, to the EPC 160 using an S1 interface for control-plane signaling and user-plane data communications. If the base station 122 connects to both the 5GC 150 and the EPC 160, the base station 122 can connect to the 5GC 150 using an NG2 interface for control-plane signaling and using an NG3 interface for user-plane data communications, at 180. In addition to connections to core networks 190, the base stations 120 can communicate with each other. The base stations 121 and 123 communicate using an Xn interface at 112, for instance. The base stations 122 and 124 communicate using an X2 interface at 114. The base stations 122 and 123 can communicate using an Xn interface at 116 to execute a handover procedure.

The 5GC 150 includes an Access and Mobility Management Function 152 (AMF 152) that provides control-plane functions such as registration and authentication of multiple UE 110, authorization, mobility management, or the like in the 5G NR network. The EPC 160 includes a Mobility Management Entity 162 (MME 162) that provides control-plane functions such as registration and authentication of multiple UE 110, authorization, mobility management, or the like in the E-UTRAN network. The AMF 152 and the MME 162 communicate with the base stations 120 in the RANs 140 and also communicate with multiple UE 110 through the base stations 120. Components of the UE 110 are further described with respect to FIG. 2.

Example Device

Figure 2:
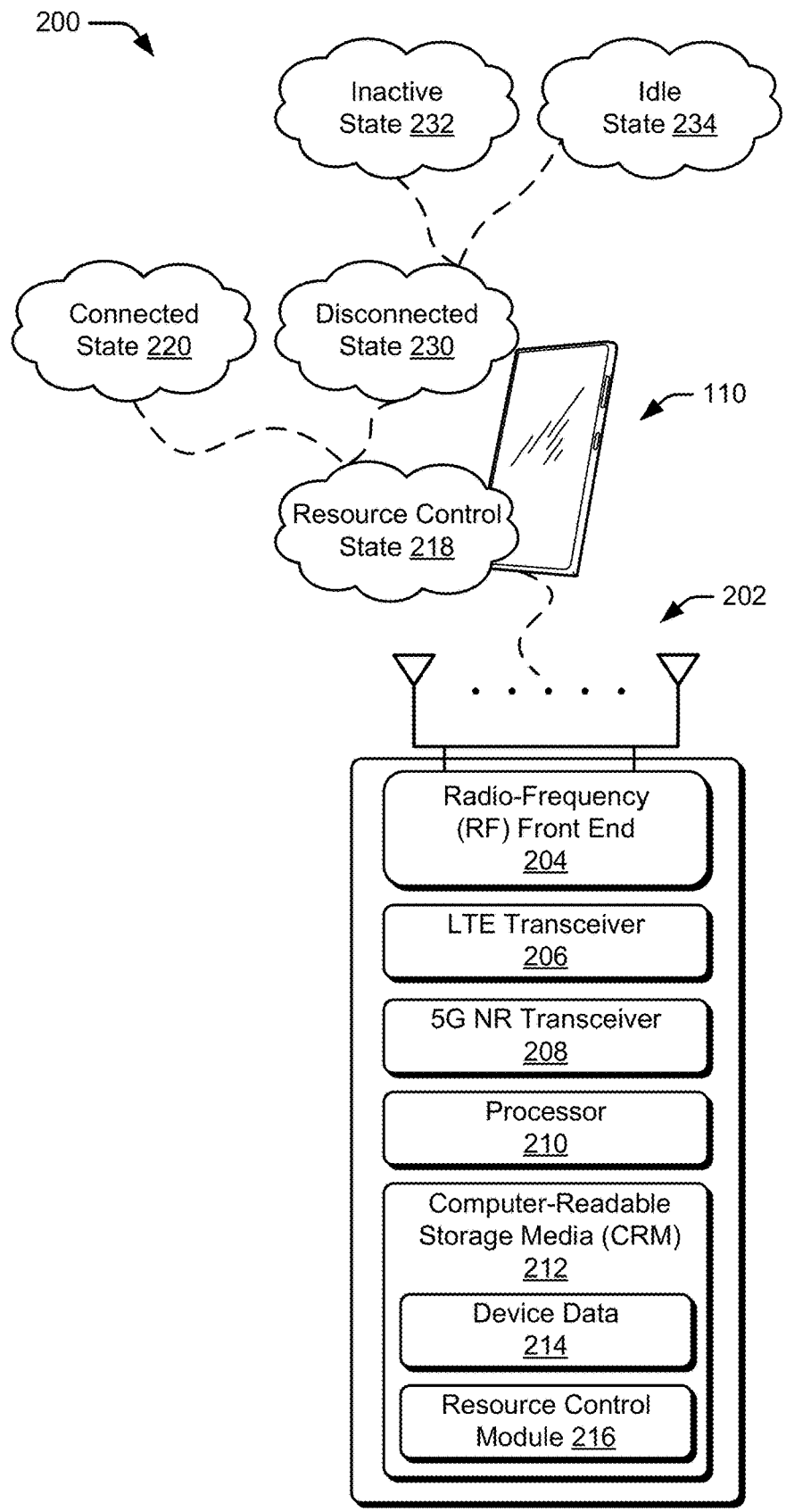
FIG. 2 illustrates an example device diagram of a user equipment for releasing information to improve cell selection in different resource control states.

FIG. 2 illustrates an example device diagram 200 of the UE 110. The UE 110 can include additional functions and interfaces that are omitted from FIG. 2 for the sake of clarity. The UE 110 includes antennas 202, a radio-frequency (RF) front end 204 (RF front end 204), an LTE transceiver 206, and a 5G NR transceiver 208 for communicating with one or more base stations 120 in the RAN 140. The RF front end 204 couples or connects the LTE transceiver 206 and the 5G NR transceiver 208 to the antennas 202 to facilitate various types of wireless communication. The antennas 202 can include an array of multiple antennas that are configured similar to or differently from each other. The antennas 202 and the RF front end 204 can be tuned to one or more frequency bands defined by the 3GPP LTE and 5G NR communication standards and implemented by the LTE transceiver 206 and/or the 5G NR transceiver 208.

The UE 110 also includes one or more processors 210 and computer-readable storage media 212 (CRM 212). The processor 210 can be a single core processor or a multiple core processor composed of a variety of materials, such as silicon, polysilicon, high-K dielectric, copper, and so on. The computer-readable storage media excludes propagating signals and the CRM 212 includes any suitable memory or storage device, such as random-access memory (RAM), static RAM (SRAM), dynamic RAM (DRAM), non-volatile RAM (NVRAM), read-only memory (ROM), or Flash memory useable to store device data 214 of the UE 110. The device data 214 includes user data, multimedia data, beamforming codebooks, applications, and/or an operating system of the UE 110, which are executable by the processor 210 to enable user-plane communication, control-plane signaling, and user interaction with the UE 110.

The CRM 212 also includes a resource control module 216. Alternately or additionally, the resource control module 216 can be implemented in whole or part as hardware logic or circuitry integrated with or separate from other components of the UE 110. The resource control module 216 can implement a radio resource control (RRC) layer, as described according to different specifications such as eLTE and 5G NR. The resource control module 216 configures the LTE transceiver 206 or the 5G NR transceiver 208 for the current resource control state 218 and performs the cell-selection procedure. In particular, the resource control module 216 configures the UE 110 to operate according to a particular resource control state 218.

In general, different resource control states 218 have different quantities or types of resources available, which may affect power consumption within the UE 110. Example resource control states 218 include a connected (e.g., active) state 220 and a disconnected state 230. The disconnected state 230 includes an inactive state 232 and an idle state 234 and generally consumes less power relative to the connected state 220. In the connected state 220, the UE 110 actively connects to the base station 120. In the inactive state 232, the UE 110 suspends connectivity with the base station 120 and retains information that enables connectivity with the base station 120 to be quickly re-established. In the idle state 234, the UE 110 releases the connection with the base station 120. Some of the resource control states 218 may be limited to certain radio-access technologies. For example, the inactive state 232 may be supported in eLTE and 5G NR, but not in 3G or other 4G standards. Other resource control states may be common or compatible across multiple RATs, such as the connected state 220 or the idle state 234. The resource control module 216 can at least partially release information to improve cell selection in different resource control states 218, as further described in FIGS. 3-7.

Figure 3:
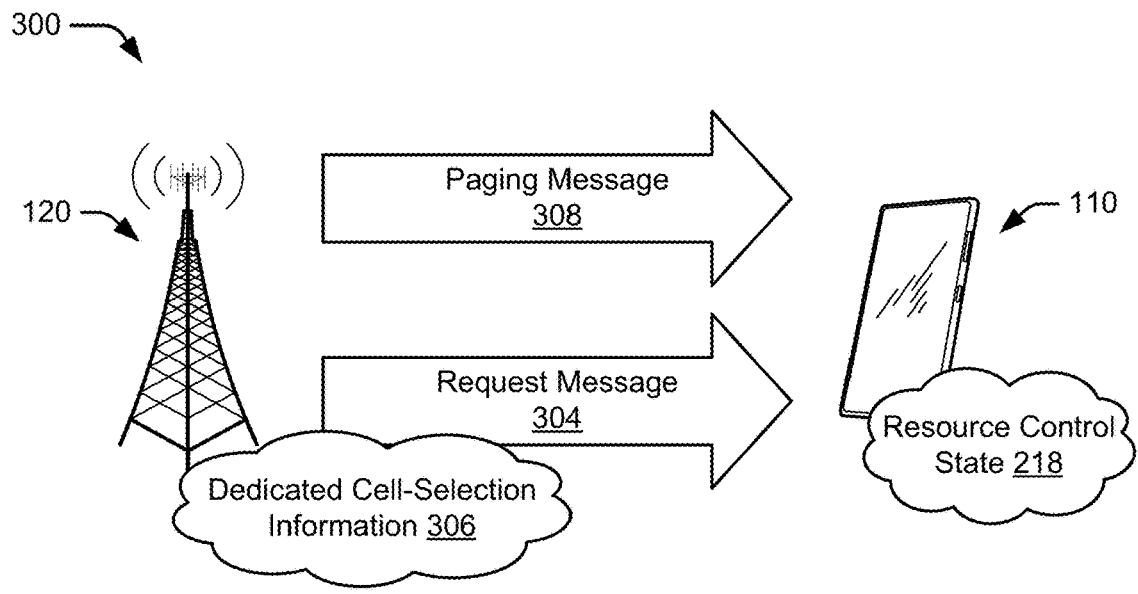
FIG. 3 illustrates an example environment in which a user equipment releases information to improve cell selection in different resource control states.
Figure 3:
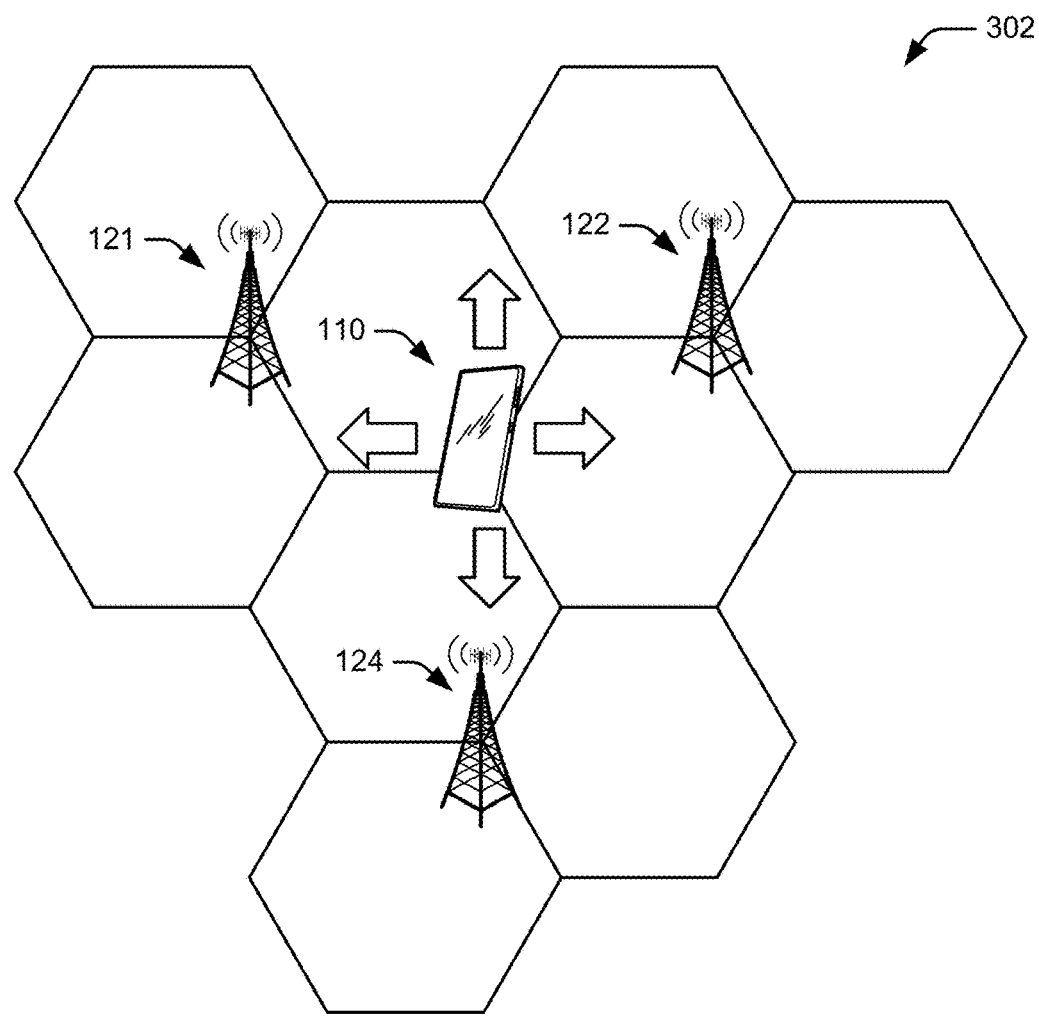

Releasing Information to Improve Cell Selection in Different Resource Control States FIG. 3 is an example environment 300 in which the UE 110 releases information to improve cell selection in different resource control states. In the example environment 300, the UE 110 and the base station 120 communicate over the wireless link 130 of FIG. 1. Different situations can cause the UE 110 to transition between different resource control states 218, as described in further detail below. In either the inactive state 232 or the idle state 234, the UE 110 can perform a cell-selection procedure, which is further described with respect to a map 302 shown at the bottom of FIG. 3.

The map 302 illustrates the UE 110 as being physically located between multiple base stations 121, 122, and 124 (e.g., cell sites). Consider that the UE 110 is in the connected state 220 and previously established a connection with the base station 121. The base station 121 uses a RAT that supports the inactive state 232, such as eLTE or 5G NG. The base station 121 can be, for example, a gNB, a ng-eNB connected with 5GC 150 as shown in FIG. 1, or an eNB connected with 5GC 150.

The base station 121 transmits a request message 304 to the UE 110, which directs the UE 110 to transition from the connected state 220 to the inactive state 232. The request message 304 can include, for example, a radio resource control (RRC) release message (e.g., an RRCRelease message) according to the eLTE or 5G NR standards. The request message 304 includes dedicated cell-selection information 306, which influences a cell-selection procedure performed by the UE 110. The cell-selection information 306 may include at least one of the following: cell-selection or cell-reselection priority information (e.g., idleModeMobilityControlInfo or cellReselectionPriorities in eLTE or 5G NR standards), depriority information (e.g., deprioritisationReq in eLTE or 5G NR standards), or cell-redirection information. In some cases, the dedicated cell-selection information 306 may also include a timer to indicate a duration (e.g., a given time frame) for which the dedicated cell-selection information 306 is to be used by the UE 110 for cell-selection procedures. Upon expiration of the timer, the dedicated cell-selection information 306 may be released by the UE 110.

As the UE 110 moves to a different geographical location while in the inactive state 232, such as towards the base station 124, the UE 110 may perform a cell-selection procedure to select or determine another cell (e.g., another base station 120). The cell-selection procedure may also be referred to as a cell-reselection procedure, which enables the UE 110 to change or switch to a different base station 120. The dedicated cell-selection information 306 provided by the request message 304, however, can influence the cell-selection procedure and bias the UE 110 towards selecting a base station 120 that supports the inactive state 232. In some cases, the selected base station 120 does not correspond to an optimal cell that provides a target communication performance due to the dedicated cell-selection information 306.

Consider a case in which the base station 124 does not support the inactive state 232 (e.g., supports technologies other than eLTE and 5G NR) while the base station 122 supports the inactive state 232. The base station 124 provides, for example, a Node B cell, a ng-eNB cell connected with EPC 160 as shown in FIG. 1, a Global System for Mobile Communication (GSM) cell, or a code-division multiple-access (CDMA) cell. The base station 122, on the other hand, provides a 5GC cell (e.g., a gNB cell or an ng-eNB cell connected with 5GC 150) or an eLTE cell. In this example, the dedicated cell-selection information 306 increases a priority of the base station 122, which increases a probability that the base station 122 is selected even if the base station 124 provides a higher signal strength or utilizes a higher priority frequency relative to the base station 122.

To enable the optimal cell (e.g., the base station 124) to be selected instead, the UE 110 releases the dedicated cell-selection information 306 in the inactive state 232. The dedicated cell-selection information 306 can be released, for example, after a first cell-selection procedure is performed in the inactive state 232 or responsive to the first cell-selection procedure selecting a cell that supports technologies other than eLTE and 5G NR while in the inactive state 232. By releasing the dedicated cell-selection information 306, a following cell-selection procedure does not utilize the dedicated cell-selection information 306 and is therefore more likely to select the optimal cell. In some cases, the UE 110 may release the dedicated cell-selection information 306 before a timer associated with the dedicated cell-selection information 306 expires or if the timer is halted or stopped (e.g., such as responsive to processing a public LAN mobile network (PLMN) selection request or responsive to transitioning to the idle state 234).

In some cases, the UE 110 transitions from the inactive state 232 to the idle state 234 upon receipt of a paging message 308 from the base station 120. If the paging message 308 includes identifier information (e.g., ue-Identity included in the PagingRecord) that matches an identifier allocated to the UE 110, the UE 110 transitions to the idle state 234. The paging message 308 can be a core-network (CN) paging message. Although cells that did not support the inactive state 232 may support the idle state 234, the dedicated cell-selection information 306 can continue to decrease a likelihood of the UE 110 from selecting these cells if the information has not been released. To enable unbiased cell selection in the idle state 234, the UE 110 releases the dedicated cell-selection information 306 prior to or after transitioning to the idle state 234. After the dedicated cell-selection information 306 is released, the UE 110 uses common cell-selection information from a system information message during a future cell-selection procedure.

Example Methods

Figure 4:
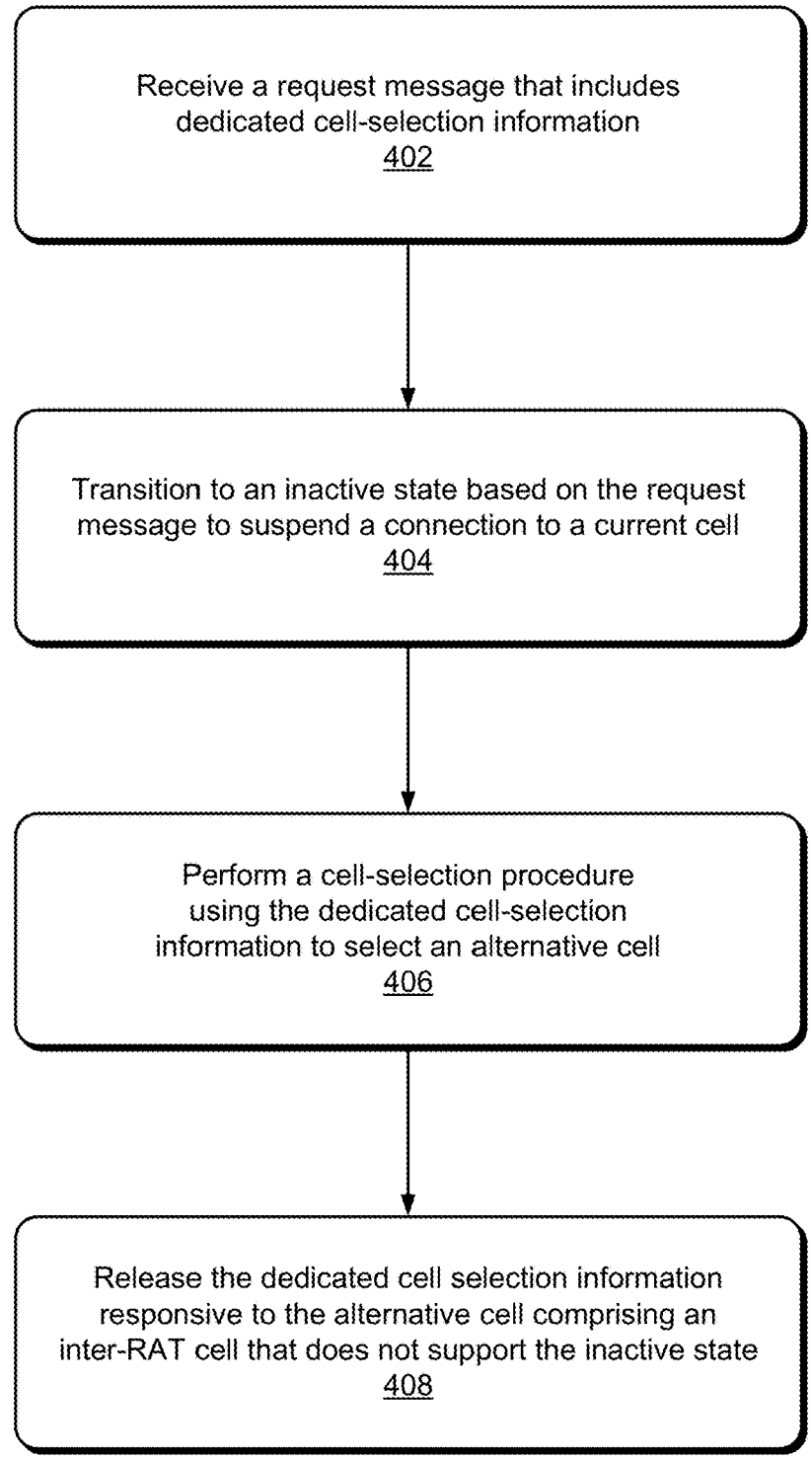
FIG. 4 illustrates an example method for releasing information to improve cell selection in different resource control states.
Figure 5:
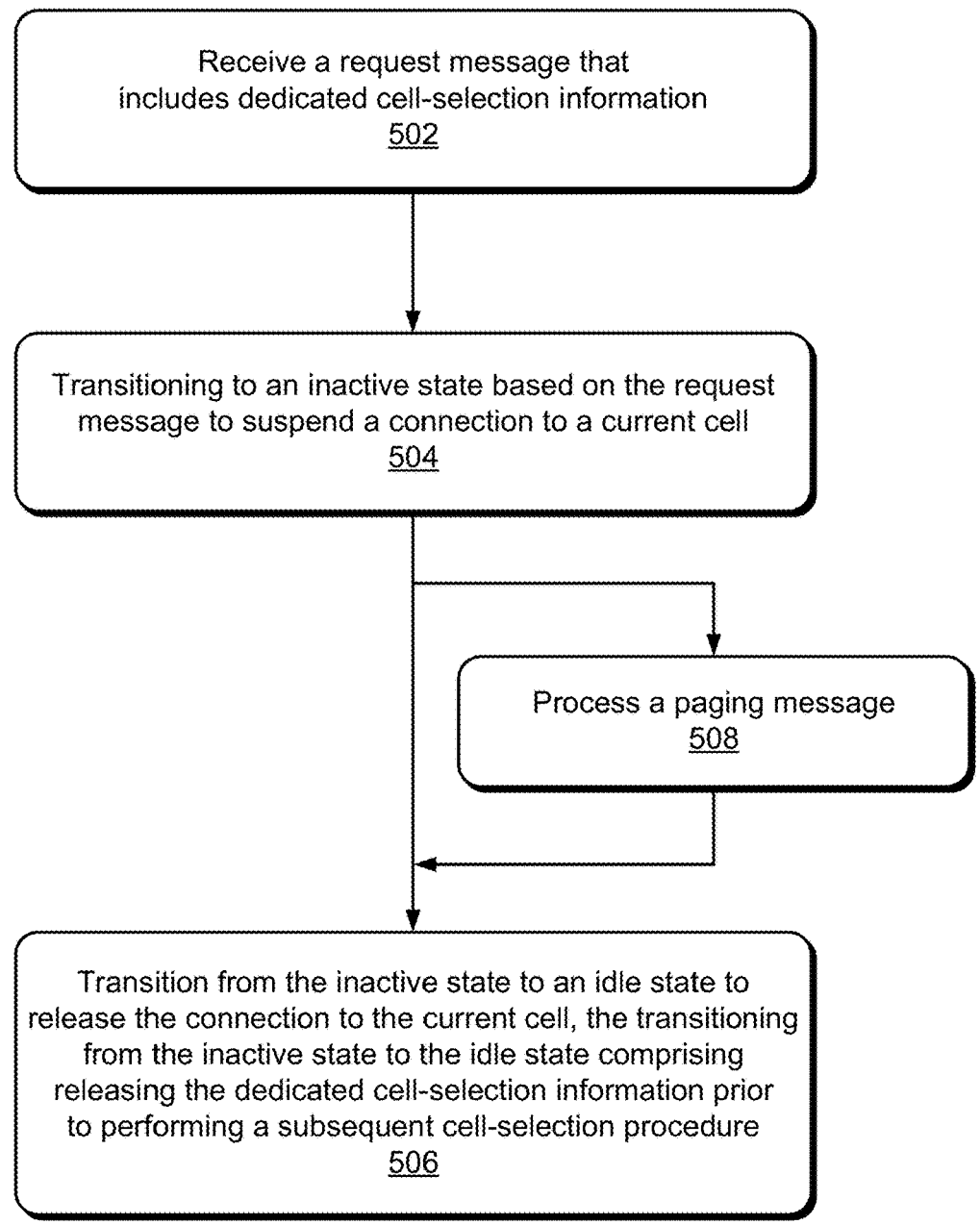
FIG. 5 illustrates another example method for releasing information to improve cell selection in different resource control states.

FIGS. 4 and 5 depict example methods 400 and 500 of a UE 110 for releasing information to improve cell selection in different resource control states. Methods 400 and 500 are shown as sets of operations (or acts) performed but not necessarily limited to the order or combinations in which the operations are illustrated. Further, any of one or more of the operations may be repeated, combined, reorganized, skipped, or linked to provide a wide array of additional and/or alternate methods. In portions of the following discussion, reference may be made to environments 100 and 300 of FIGS. 1 and 3 and entities detailed in FIG. 2, reference to which is made for example only. The techniques are not limited to performance by one entity or multiple entities operating on one device.

At 402 in FIG. 4, the UE receives a request message that includes dedicated cell-selection information. For example, the UE 110 receives the request message 304 of FIG. 3, which is transmitted by the base station 120. The request message 304 includes the dedicated cell-selection information 306. Different types of dedicated cell-selection information 306 includes cell-selection priority information or cell-reselection priority information (e.g., idleModeMobilityControlInfo or cellReselectionPriorities), depriority information, (e.g., deprioritisationReq), cell-redirection information, a timer, or a combination thereof. The request message 304 can be an RRCRelease message.

At 404, the UE transitions to an inactive state based on the request message to suspend a connection to a current cell. For example, the resource control module 216 of FIG. 2 causes the UE 110 to transition to the inactive state 232 from the connected state 220. The inactive state 232 is a type of resource control state 218 that suspends the connection to the current cell (e.g., to the base station 120). In some cases the current cell is a gNB cell, a ng-enB cell connected with 5GC 150, or an eNB connected with the 5GC 150.

At 406, the UE performs a cell-selection procedure using the dedicated cell-selection information to select an alternative cell. The resource control module 216, for example, performs the cell-selection procedure using the dedicated cell-selection information 306 to select another cell or another base station 120. In some situations, the cell-selection procedure may re-select the current cell.

At 408, the UE releases the dedicated cell-selection information responsive to the alternative cell comprising an inter-radio access technology (inter-RAT) cell that does not support the inactive state. For example, the resource control module 216 releases the dedicated cell-selection information 306 if the alternative cell is a Node B cell, a ng-eNB cell connected with EPC 160, a GSM cell, or a CDMA cell. In other words, the alternative cell does not use or support the eLTE or 5G NR standards. By releasing the dedicated cell-selection information 306, the resource control module 216 can perform a subsequent cell-selection procedure that is independent of (e.g., doesn't rely upon) the dedicated cell-selection information 306. In some cases, the resource control module 216 utilizes common cell-selection information provided by a system information message to perform the subsequent cell-selection procedure.

At 502 in FIG. 5, the UE receives a request message that includes dedicated cell-selection information, as described above at 402 in FIG. 4.

At 504, the UE transitions to an inactive state based on the request message to suspend a connection to a current cell. For example, the resource control module 216 causes the UE 110 to transition to the inactive state 232 based on the request message 304 of FIG. 3, as described above at 404 in FIG. 4.

At 506, the UE transitions from the inactive state to an idle state to release the connection to the current cell. The transitioning from the inactive state to the idle state includes releasing the dedicated cell-selection information prior to performing a subsequent cell-selection procedure. For example, the resource control module 216 causes the UE 110 to transition from the inactive state 232 to the idle state 234. The idle state 234 is a type of resource control state 218 that causes the connection to the current cell or current base station 120 to be released.

In some cases, the resource control module 216 transitions to the idle state 234 responsive to receiving a paging message 308. At 508, the UE processes the paging message. For example, the UE 110 processes the paging message 308 and the resource control module 216 transitions to the idle state 234 responsive to processing the paging message 308.

As part of transitioning from the inactive state to the idle state, the resource control module 216 releases the dedicated cell-selection information 306 prior to performing the subsequent cell-selection procedure. The dedicated cell-selection information 306 can be released while the UE 110 is in the inactive state 232 or the idle state 234. By releasing the dedicated cell-selection information 306, the resource control module 216 can perform the subsequent cell-selection procedure without using the dedicated cell-selection information 306, which may be applicable while the resource control module 216 is in the idle state 234.

Figure 6:
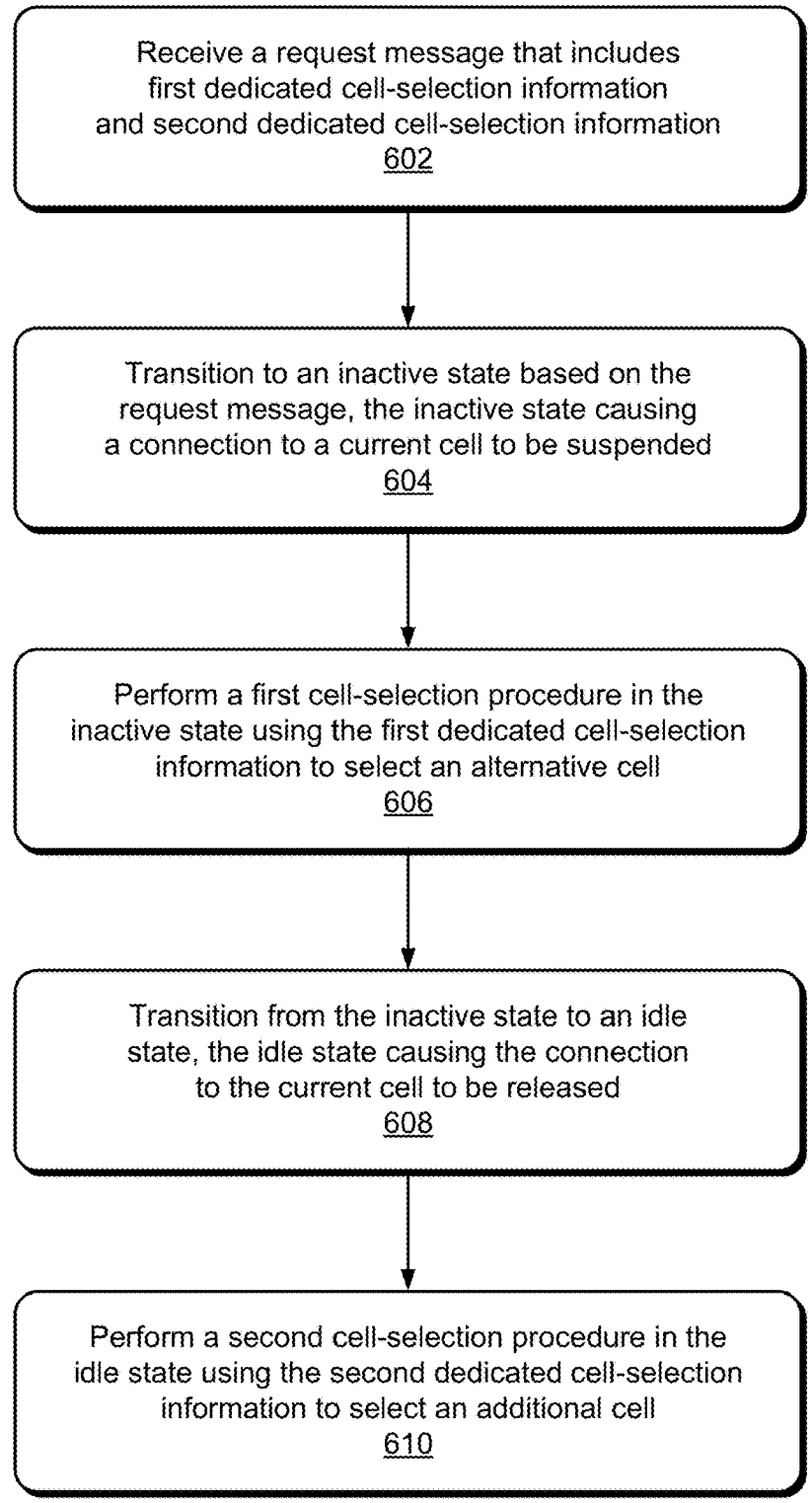
FIG. 6 illustrates an example method for utilizing different dedicated cell-selection information for different resource control states.

FIG. 6 depicts an example method 600 of a UE 110 for utilizing different dedicated cell-selection information for different resource control states. Method 600 is shown as a set of operations (or acts) performed but not necessarily limited to the order or combinations in which the operations are illustrated. Further, any of one or more of the operations may be repeated, combined, reorganized, skipped, or linked to provide a wide array of additional and/or alternate methods. In portions of the following discussion, reference may be made to environments 100 and 300 of FIGS. 1 and 3 and entities detailed in FIG. 2, reference to which is made for example only. The techniques are not limited to performance by one entity or multiple entities operating on one device.

At 602, the UE receives a request message that includes first dedicated cell-selection information and second dedicated cell-selection information. For example, the UE 110 receives the request message 304 of FIG. 3. The request message 304 includes at least two dedicated cell-selection information 306, which are associated with different resource control states 218. Consider that the first dedicated cell-selection information 306 is associated with the inactive state 232 and the second dedicated cell-selection information 306 is associated with the idle state 234.

At 604, the UE transitions to an inactive state based on the request message. The inactive state causes a connection to a current cell to be suspended. Similar to 404 of FIG. 4, the resource control module 216 of FIG. 2 causes the UE 110 to transition to the inactive state 232. The inactive state 232 causes a connection to a current cell or base station 120 to be suspended.

At 606, the UE performs a first cell-selection procedure in the inactive state using the first dedicated cell-selection information. For example, the resource control module 216 performs the first cell-selection procedure using the first dedicated cell-selection information 306. In some cases, the first dedicated cell-selection information 306 is released responsive to performing the first cell-selection procedure, as described at 408 in FIG. 4. If the first dedicated cell-selection information 306 is not released after the first cell-selection procedure is performed, the first dedicated cell-selection information 306 can be used again in a subsequent cell-selection procedure performed in the inactive state 232.

At 608, the UE transitions to an idle state from the inactive state. The idle state causes the connection to the alternative cell to be released. For example, the resource control module 216 causes the UE 110 to transition from the inactive state 232 to the idle state 234, as described at 506 in FIG. 5.

At 610, the UE performs a second cell-selection procedure in the idle state using the second dedicated cell-selection information to select an additional cell. For example, the resource control module 216 performs the second cell-selection procedure using the second dedicated cell-selection information 306. Because the second dedicated cell-selection information 306 is unique to the idle state 234, the second dedicated cell-selection information 306 enables the cell-selection procedure to select an optimal cell to achieve a target performance.

Figure 7:
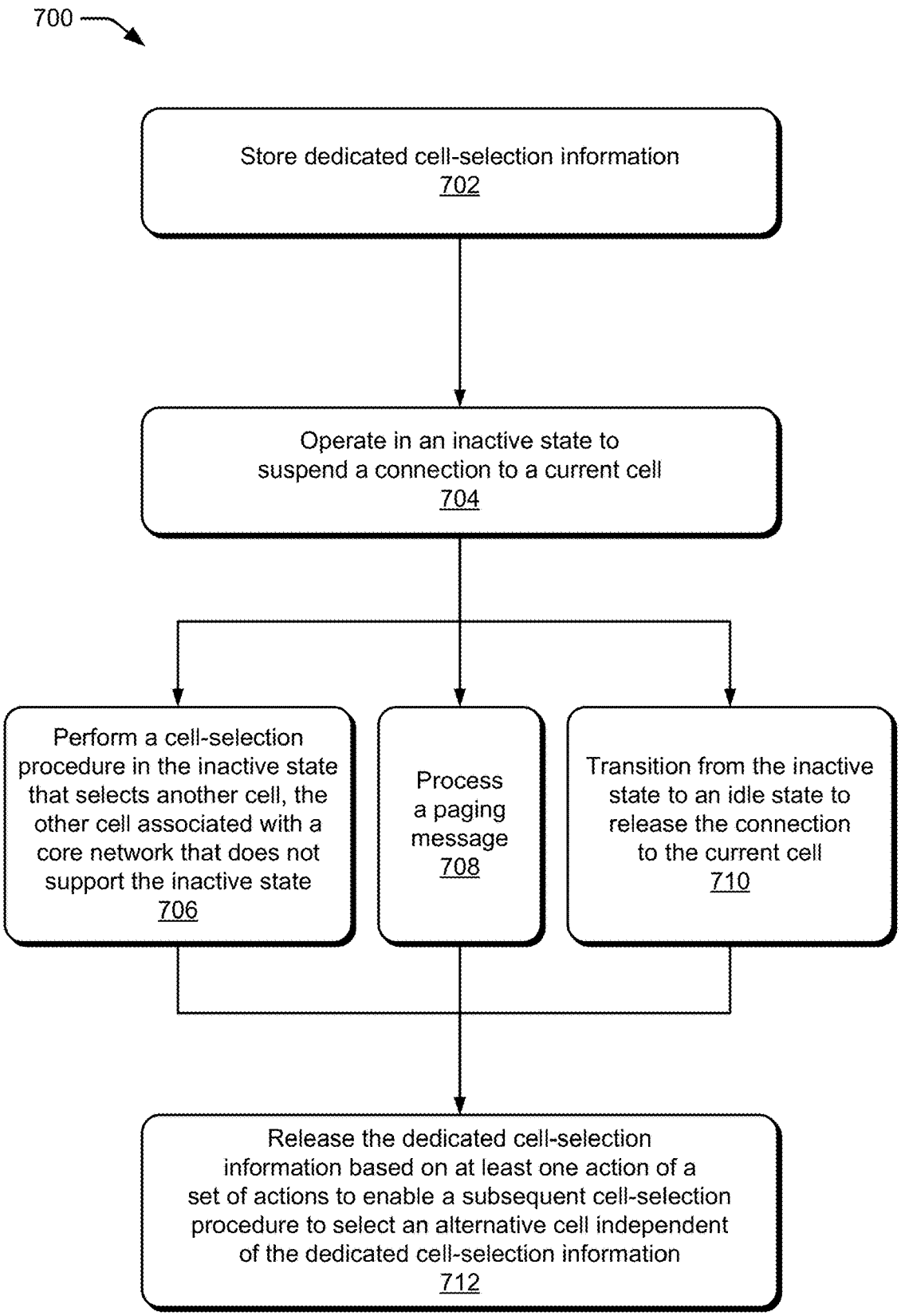
FIG. 7 illustrates yet another example method for releasing information to improve cell selection in different resource control states.

FIG. 7 depicts an example method 700 of a UE 110 for releasing information to improve cell selection in different resource control states. Method 700 is shown as a set of operations (or acts) performed but not necessarily limited to the order or combinations in which the operations are illustrated. Further, any of one or more of the operations may be repeated, combined, reorganized, skipped, or linked to provide a wide array of additional and/or alternate methods. In portions of the following discussion, reference may be made to environments 100 and 300 of FIGS. 1 and 3 and entities detailed in FIG. 2, reference to which is made for example only. The techniques are not limited to performance by one entity or multiple entities operating on one device.

At 702, the UE stores dedicated cell-selection information. For example, the UE 110 stores the dedicated cell-selection information 306 of FIG. 3. In some cases, the UE 110 receives the dedicated cell-selection information 306 from the request message 304 of FIG. 3, which is described above at 402 in FIG. 4.

At 704, the UE operates in an inactive state to suspend a connection to a current cell. For example, the resource control module 216 causes the UE 110 to operate in the inactive state 232 to suspend the connection to a current cell. In some cases, the resource control module 216 suspends the connection responsive to the UE 110 receiving the request message 304.

The UE performs at least one action of a set of actions, which includes the actions described at 706, 708, and 710. At 706, the UE performs a cell-selection procedure in the inactive state that selects another cell. The other cell is associated with a core network that does not support the inactive state. For example, the resource control module 216 performs a cell-selection procedure in the inactive state 232 that selects another cell that is associated with a core network that does not support the inactive state 232, such as the EPC 160. In some cases, the UE 110 transitions from the inactive state 232 to the idle state 234 responsive to the selection of the other cell.

At 708, the UE processes a paging message. For example, the UE 110 processes the paging message 308 of FIG. 3. In some cases, the paging message 308 directs the UE 110 to transition from the inactive state 232 to the idle state 234.

At 710, the UE transitions from the inactive state to an idle state to release the connection to the current cell. For example, the UE 110 transitions from the inactive state 232 to the idle state 234.

At 712, the UE releases the dedicated cell-selection information based on at least one action of the set of actions to enable a subsequent cell-selection procedure to select an alternative cell independent of the dedicated cell-selection information. For example, the resource control module 216 releases the dedicated cell-selection information 306 based on an occurrence of one or more of the actions described above at 706, 708, and 710. This enables a subsequent cell-selection procedure to select an alternative cell independent of the dedicated cell-selection information.

CONCLUSION

Although techniques using, and apparatuses including, releasing information to improve cell selection in different resource control states have been described in language specific to features and/or methods, it is to be understood that the subject of the appended claims is not necessarily limited to the specific features or methods described. Rather, the specific features and methods are disclosed as example implementations of releasing information to improve cell selection in different resource control states.

What is claimed is:

1. A method performed by a user equipment, the method comprising:
    receiving, from a base station, IdleModeMobilityControlInfo for the user equipment to use for cell reselection;
    storing the IdleModeMobilityControlInfo;
    operating in an inactive state to suspend a connection to a current cell;
    processing a paging message, the paging message directing the user equipment to transition from the inactive state to an idle state; and
    responsive to processing the paging message, releasing the IdleModeMobilityControlInfo.

2. The method of claim 1, wherein the releasing comprises:
    releasing the IdleModeMobilityControlInfo while operating in the inactive state.

3. The method of claim 1, further comprising:
    receiving the paging message while operating in the inactive state; and
    responsive to processing the paging message, transitioning from the inactive state to the idle state.

4. The method of claim 3, wherein:
    the paging message includes identifier information; and
    the processing of the paging message comprises:
        determining that an identifier of the user equipment matches the identifier information provided by the paging message.

5. The method of claim 1, wherein the receiving comprises:
    receiving a request message that includes the IdleModeMobilityControlInfo.

6. The method of claim 5, wherein:
    the request message includes other IdleModeMobilityControlInfo; and the method further comprises:
    transitioning from the inactive state to the idle state; and
    performing a subsequent cell-selection procedure in the idle state using the other IdleModeMobilityControlInfo to select an alternative cell.

7. The method of claim 1, wherein the receiving comprises:
    receiving an RRCRelease message that includes the IdleModeMobilityControlInfo.

8. The method of claim 1, wherein the IdleModeMobilityControlInfo comprises at least one of the following:
    cell-selection priority information;
    cell-reselection priority information; or
    a timer that specifies a time that the user equipment releases the IdleModeMobilityControlInfo.

9. The method of claim 8, wherein:
    the IdleModeMobilityControlInfo comprises the cell-selection priority information and the timer; and the releasing comprises:
　　releasing the IdleModeMobilityControlInfo prior to the time specified by the timer.

10. A user equipment comprising:
　　a radio-frequency transceiver; and
　　a processor and memory system configured to:
　　　　receive, from a base station, IdleModeMobilityControlInfo for the user equipment to use for cell reselection;
　　　　store the IdleModeMobilityControlInfo;
　　　　operate in an inactive state to suspend a connection to a current cell;
　　　　　　process a paging message, the paging message directing the user equipment to transition from the inactive state to an idle state; and
　　　　　　responsive to processing the paging message, release the IdleModeMobilityControlInfo.

11. The user equipment of claim 10, wherein the processor and memory system are further configured to:
　　release the IdleModeMobilityControlInfo while in the inactive state.

12. The user equipment of claim 10, wherein the processor and memory system are further configured to:
　　receive a request message that includes the IdleModeMobilityControlInfo.

13. The user equipment of claim 10, wherein the processor and memory system are further configured to:
　　receive an RRCRelease message that includes the IdleModeMobilityControlInfo.

14. The user equipment of claim 10, wherein the IdleModeMobilityControlInfo comprises at least one of the following:
　　cell-selection priority information;
　　cell-reselection priority information; or
　　a timer that specifies a time that the user equipment releases the IdleModeMobilityControlInfo.

15. The user equipment of claim 14, wherein:
　　the IdleModeMobilityControlInfo comprises the timer; and
　　the release of the IdleModeMobilityControlInfo occurs prior to the time specified by the timer.

16. A method performed by a user equipment, the method comprising:
　　receiving, from a base station, IdleModeMobilityControlInfo for the user equipment to use for cell reselection;
　　storing the IdleModeMobilityControlInfo;
　　operating in an inactive state to suspend a connection to a current cell;
　　performing a cell-reselection procedure in the inactive state that selects another cell, the other cell associated with a core network that does not support the inactive state; and
　　responsive to selecting the other cell, releasing the IdleModeMobilityControlInfo.

17. The method of claim 16, further comprising:
　　responsive to the selecting of the other cell, transitioning from the inactive state to an idle state.

18. The method of claim 16, wherein:
　　the current cell comprises one of the following:
　　　　a next-generation Node B cell;
　　　　a next-generation evolved Node B cell connected with a Fifth-Generation core network; or
　　　　an Evolved Universal Terrestrial Radio Access Node B cell connected with the Fifth-Generation core network; and
　　the other cell comprises one of the following:
　　　　a Node B cell;
　　　　an evolved Node B cell connected with evolved packet core;
　　　　another ng-eNB cell connected with evolved packet core;
　　　　a Global System for Mobile Communication cell; or
　　　　a code-division multiple-access cell.

19. The method of claim 16, wherein the receiving comprises:
　　receiving an RRCRelease message that includes the IdleModeMobilityControlInfo.

20. The method of claim 16, wherein the releasing comprises:
　　releasing the IdleModeMobilityControlInfo while operating in the inactive state.

* * * * *